(12) United States Patent
Yukishima et al.

(10) Patent No.: US 9,180,771 B2
(45) Date of Patent: Nov. 10, 2015

(54) IN-WHEEL MOTOR DRIVE DEVICE

(75) Inventors: Ryou Yukishima, Iwata (JP); Minoru Suzuki, Iwata (JP); Ken Yamamoto, Iwata (JP)

(73) Assignee: NTN CORPORATION, Osaka (JP)

( * ) Notice: Subject to any disclaimer, the term of this patent is extended or adjusted under 35 U.S.C. 154(b) by 193 days.

(21) Appl. No.: 13/980,477

(22) PCT Filed: Jan. 11, 2012

(86) PCT No.: PCT/JP2012/050299
§ 371 (c)(1),
(2), (4) Date: Jul. 18, 2013

(87) PCT Pub. No.: WO2012/098957
PCT Pub. Date: Jul. 26, 2012

(65) Prior Publication Data
US 2013/0292993 A1   Nov. 7, 2013

(30) Foreign Application Priority Data

Jan. 21, 2011   (JP) .................................. 2011-010452

(51) Int. Cl.
B60K 7/00       (2006.01)
F16C 19/18      (2006.01)
(Continued)

(52) U.S. Cl.
CPC ............. B60K 7/0007 (2013.01); B60K 17/043 (2013.01); B60K 17/145 (2013.01); F16C 19/186 (2013.01); B60K 7/00 (2013.01); B60K 17/04 (2013.01); B60K 2007/0038 (2013.01);
(Continued)

(58) Field of Classification Search
None
See application file for complete search history.

(56) References Cited

U.S. PATENT DOCUMENTS

| 7,886,858 B2 * | 2/2011 | Ai .............................. 180/65.51 |
| 2011/0133541 A1 * | 6/2011 | Makino et al. ................. 301/6.5 |
| 2013/0012350 A1 | 1/2013 | Ebner |

FOREIGN PATENT DOCUMENTS

| CN | 101032920 | 9/2007 |
| DE | 10 2011 011 012 | 8/2011 |

(Continued)

OTHER PUBLICATIONS

International Preliminary Report on Patentability and Written Opinion of the International Searching Authority issued Aug. 1, 2013 in International (PCT) Application No. PCT/JP2012/050299.

(Continued)

*Primary Examiner* — John Walters
*Assistant Examiner* — Hilary L Johns
(74) *Attorney, Agent, or Firm* — Wenderoth, Lind & Ponack, L.L.P.

(57) ABSTRACT

An in wheel motor driving device which has a deceased axial dimension and includes aluminum alloy housings having a minimum wall thickness for reduced weight while retaining good assemblability. An in-wheel motor driving device includes: a motor section which has an output shaft; a wheel hub bearing section C; and a speed reducer section which connects the output shaft of the motor section and the wheel hub bearing section coaxially with each other. A housing outer circumferential portion of the motor section and a housing outer circumferential portion of the speed reducer section are integral with each other, being provided by one, outer circumferential member. An outboard-side end member is fixed to an outboard-side end of the outer circumferential member by means of bolts, and the wheel hub bearing section has its fixing ring fixed to the outboard-side end member.

8 Claims, 10 Drawing Sheets

(51) Int. Cl.
  *B60K 17/14* (2006.01)
  *B60K 17/04* (2006.01)

(52) U.S. Cl.
  CPC ..... *B60K 2007/0092* (2013.01); *F16C 2326/02* (2013.01)

(56) References Cited

FOREIGN PATENT DOCUMENTS

| JP | 2008-202746 | | | 9/2008 |
|---|---|---|---|---|
| JP | 2008202746 | A | * | 9/2008 |
| JP | 2009-120021 | | | 6/2009 |
| JP | 2009120021 | A | * | 6/2009 |
| JP | 2010-60026 | | | 3/2010 |
| JP | 2010-221964 | | | 10/2010 |
| JP | 2010-255713 | | | 11/2010 |
| WO | 2011/098594 | | | 8/2011 |
| WO | 2011/098596 | | | 8/2011 |
| WO | 2011/114768 | | | 9/2011 |

OTHER PUBLICATIONS

Supplementary European Search Report issued Jun. 3, 2014 in corresponding European Application No. 12736910.6.
International Search Report issued Mar. 19, 2012 in International (PCT) Application No. PCT/JP2012/050299.

* cited by examiner

IN-WHEEL MOTOR DRIVE DEVICE

TECHNICAL FIELD

The present invention relates to in-wheel motor driving devices.

BACKGROUND ART

A conventional in-wheel motor driving device 101 is disclosed in JP-A-2010-255713 (Patent Literature 1) for example.

The in-wheel motor driving device 101 which is presented in FIG. 10 includes a motor section 103 which rotatably drives an output shaft 106; a speed reducer section 105 which reduces rotation of the output shaft 106 and transmits the rotation to a wheel-side output shaft 108; and a wheel hub bearing section 104 which has a wheel hub 109 connected and fixed to the wheel-side output shaft 108.

As shown in FIG. 11, the in-wheel motor driving device 101 arranged as described above is designed so that the motor section 103 and the speed reducer section 105 are assembled independently from each other, and then a housing 107 of the speed reducer section 105 and a housing 102 of the motor section 103 are fastened to each other with bolts 110.

Also, in the example in FIG. 10 and FIG. 11, the wheel hub bearing section 104 has a fixing ring 111 (fixing member), which is fastened to the housing 107 of the speed reducer section 105 by using bolts 112.

CITATION LIST

Patent Literature

Patent Literature 1: JP-A-2010-255713

SUMMARY OF INVENTION

Technical Problem

In the in-wheel motor driving device 101, the housing 102 of the motor section 103 and the housing 107 of the speed reducer section 105 are usually made of aluminum alloy for weight reduction.

A problem, however, is that as long as the housing 102 of the motor section 103 and the housing 107 of the speed reducer section 105 are fastened with bolts 110, it is imperative that bolt holes for bolting the two aluminum alloy members must be made longer than in cases where the two members are made of steel, in order to ensure that sufficient strength will be provided by the aluminum alloy.

Also, bolt fastening areas are traditionally formed relatively long, and given a greater thickness than other walls.

If it is impossible to give an increased wall thickness only in the bolt fastening areas, the in-wheel motor unit has to be given an increased axial length, which results in a problem of overall increase in the weight.

Any bolt holes which communicate with internal space are undesirable since they can be potential route for oil leakage. Thus, if all bolt holes are designed so as not to communicate with internal space, then the wall thickness may have to be further increased.

Therefore, it is an object of the present invention to provide an in-wheel motor driving device which has a deceased axial dimension and includes aluminum alloy housings having a minimum wall thickness for reduced weight while retaining good assemblability.

Solution to Problem

In order to achieve the object stated above, an in-wheel motor driving device provided by the present invention includes: a motor section including an output shaft; a wheel hub bearing section; and a speed reducer section connecting the wheel hub bearing section coaxially with the output shaft of the motor section. With the above arrangement, a housing outer circumferential portion of the motor section and a housing outer circumferential portion of the speed reducer section are integral with each other, being provided by one, outer circumferential member. An outboard-side end member is fixed to an outboard-side end of the outer circumferential member, and the wheel hub bearing section has its fixing ring fixed to the outboard-side end member.

The wheel hub bearing section includes: a hub ring for mounting a wheel; the fixing ring for fixing to a vehicle; and a double-row rolling bearing between the hub ring and the fixing ring.

The double-row rolling bearing's inner track surfaces and outer track surfaces may be formed separately from the hub ring and from the fixing ring: The outer track surfaces may be formed on an inner circumferential surface of the fixing ring; or one of the double-row inner track surfaces may be formed on an outer circumferential surface of the hub ring.

The outboard-side end member may be made of a lightweight metal.

Also, the fixing ring of the wheel hub bearing section and the outboard-side end member may be formed as integrated with each other.

In cases where the fixing ring of the wheel hub bearing section and the outboard-side end member are formed integrally with each other, it is desirable that the double-row rolling bearing has its outer track surface(s) formed on a separate member, and a lightweight metal material is used to form the integrated piece of the wheel hub bearing section fixing ring and outboard-side end member.

Also, it is preferable that the outer circumferential member is formed of a lightweight metal material such as an aluminum alloy.

It is desirable that a seal member is disposed between the outboard-side end member and the outer circumferential member in order to prevent oil leakage from inside. The seal member may be provided by an O-ring.

Advantageous Effects of Invention

According to the present invention, a housing outer circumferential portion of the motor section and a housing outer circumferential portion of the speed reducer section are integral with each other, being provided by a single outer circumferential member as described above, whereby the invention has eliminated the need for bolts which are otherwise necessary for fastening the motor section housing and the speed reducer section housing with each other.

Therefore, the motor section housing and the speed reducer section housing can be formed of a lightweight metal for weight reduction while maintaining a minimum wall thickness, without the need for increased axial dimension which is otherwise necessary for fastening with bolts. The invention thus provides maximum weight reduction.

Further, an outboard-side end member is bolted to an outboard-side end surface of the outer circumferential member. This ensures the use of conventional procedures of assembling the motor section and the speed reducer section from the axial direction, so the invention does not sacrifice assemblability.

DESCRIPTION OF EMBODIMENTS

Hereinafter, embodiments of the present invention will be described based on the attached drawings.

Figure 7:
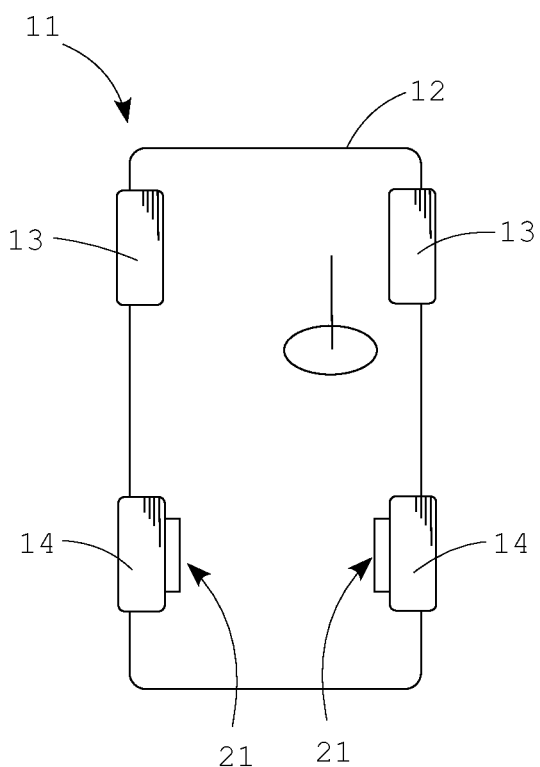
FIG. 7 is a schematic plan view of an electric vehicle which includes in-wheel motor driving devices.
Figure 8:
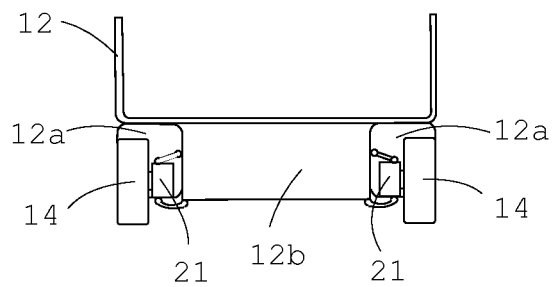
FIG. 8 is a rear view of the electric vehicle in FIG. 7.

As shown in FIG. 7, an electric vehicle 11 equipped with in-wheel motor driving devices according to an embodiment of the present invention includes a chassis 12, front wheels 13 as steering wheels, rear wheels 14 as driving wheels, and in-wheel motor driving devices 21 which transmit driving forces to the left and the right rear wheels 14 respectively. As shown in FIG. 8, the rear wheels 14 are housed inside wheel housings 12a of the chassis 12, and are fixed to a lower portion of the chassis 12 via a suspension system (suspension) 12b.

The suspension system 12b includes suspension arms extending in the left-right direction and supporting the rear wheels 14, and struts each having a coil spring section and a shock absorber, thereby absorbing vibrations coming from the ground through the rear wheels 14 and reducing vibration of the chassis 12. Further, a stabilizer which reduces tilting of the vehicle body during a turning operation for example, is provided at each of the left and right connections of the suspension arms. Preferably, the suspension system 12b should be designed as an independent suspension system which is capable of allowing the left and the right wheels to move in vertical direction independently from each other for improved ground following and efficient transmission of driving force to the road surface even if the road surface has some irregularities.

In the electric vehicle 11, each of the in-wheel motor driving devices 21 is housed individually inside the corresponding wheel housing 12a and drives one of the left and the right rear wheels 14. Therefore there is no need for providing a motor, a drive shaft, a deferential gear mechanism, etc. on the chassis 12. This provides an advantage that a wide space can be used for the driver and passengers and rotation of the left and the right drive wheels can be controlled independently from each other.

It is necessary, however, to reduce the unsprung weight in order for the electric vehicle 11 to have improved driving stability. Also, in order to provide more driver/passenger space, there is a requirement for size/weight reduction in the in-wheel motor driving devices 21.

Figure 1:
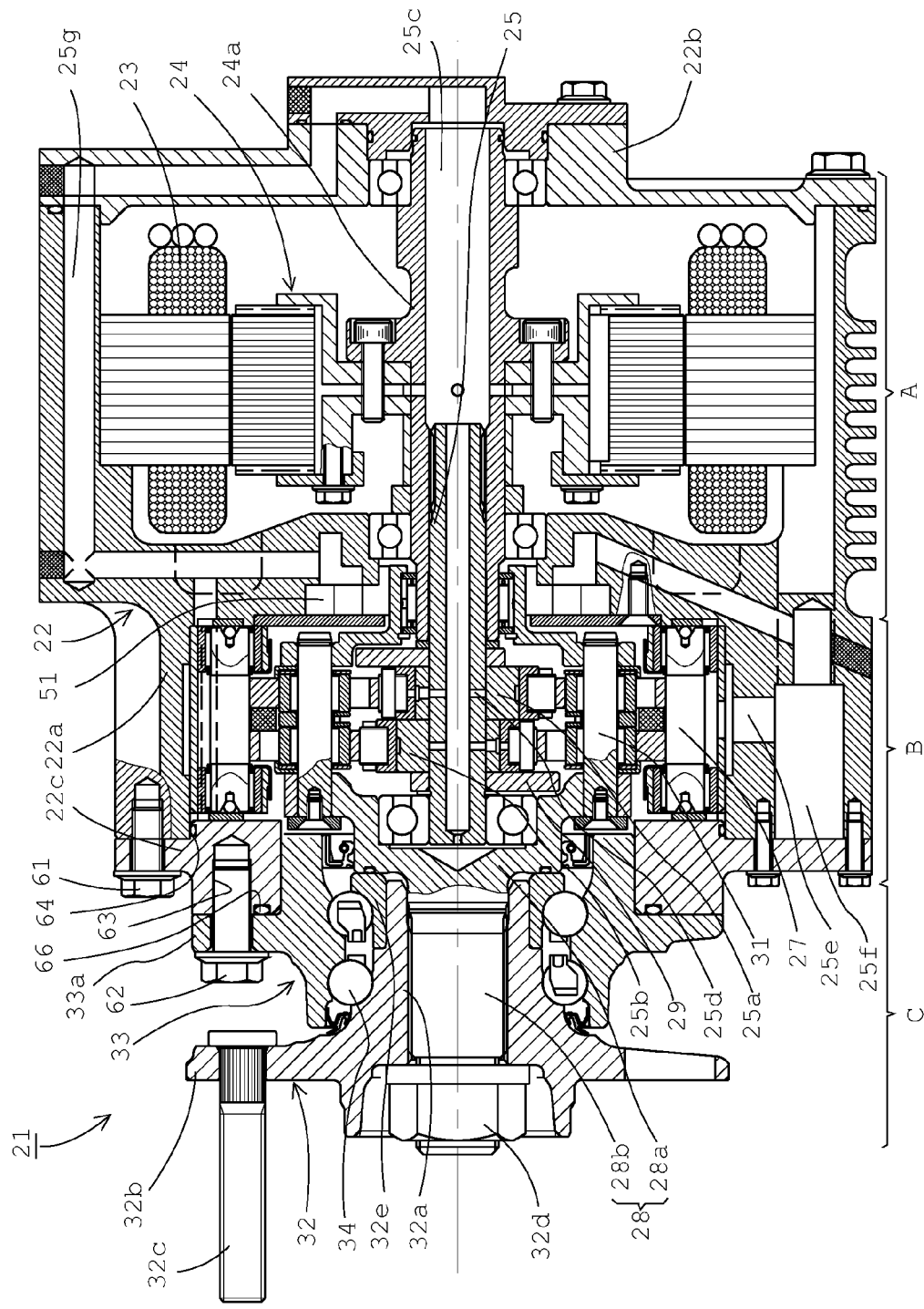
FIG. 1 is a schematic sectional view of an in-wheel motor driving device according to an embodiment of the present invention.

As shown in FIG. 1, the in-wheel motor driving device 21 includes a motor section A which generates a driving force; a speed reducer section B which reduces rotating speed of the motor section A and outputs the rotating force; and a wheel hub bearing section C which transmits the output from the speed reducer section B to a driving wheel 14.

The motor section A and the speed reducer section B share an outer circumferential member 22a in outer circumferential portions of their respective housing. The outer circumferential member 22a is made of a lightweight metal such as an aluminum alloy.

The outer circumferential member 22a has an inboard-side end, which is closed with an inboard-side end member 22b.

The outer circumferential member 22a has an outboard-side end, to which an outboard-side end member 22c is fastened with bolts 61, and to this outboard-side end member 22c, a fixing ring 33 of the wheel hub bearing section C is fastened with bolts 62.

Figure 2:
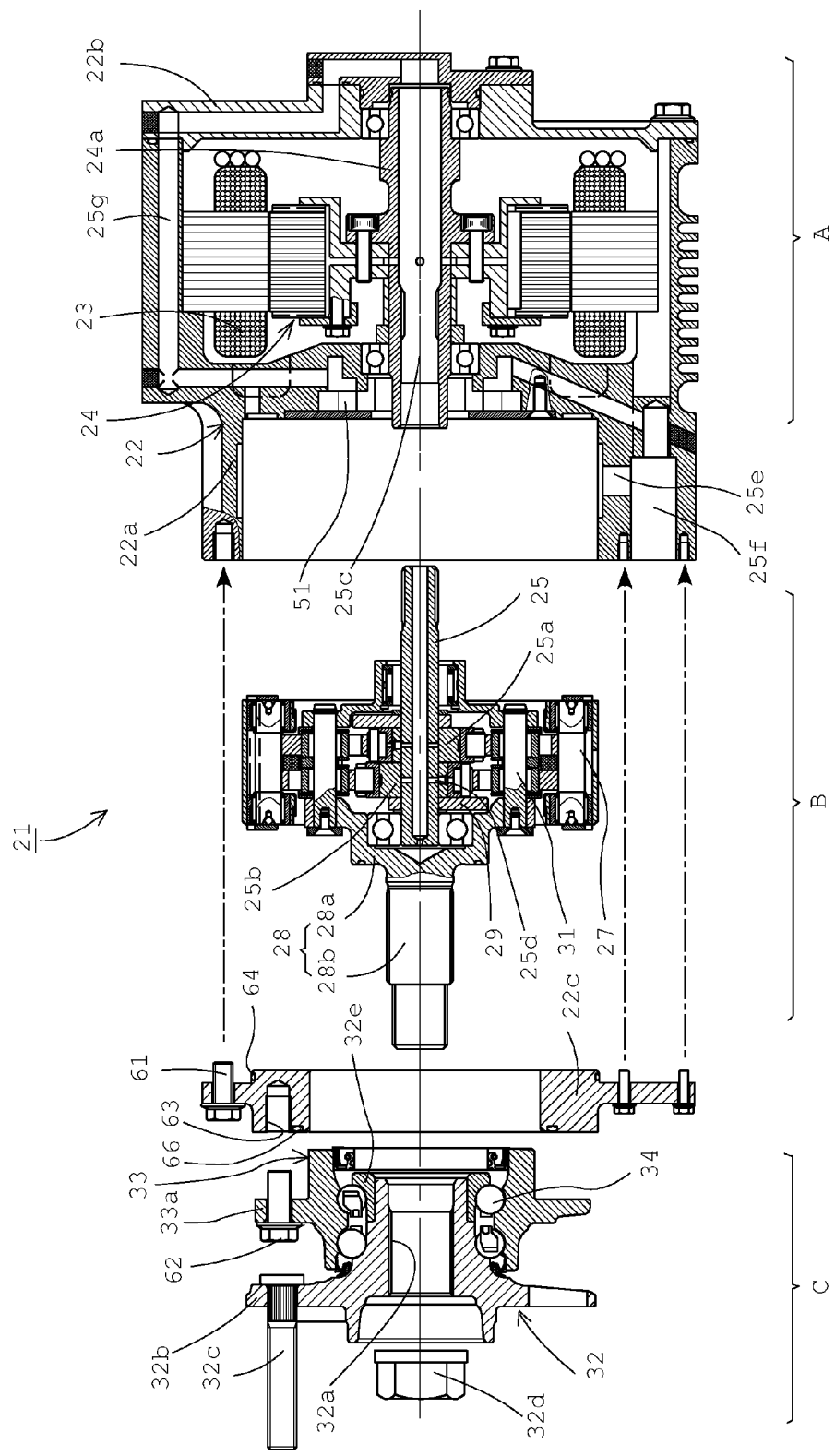
FIG. 2 is an exploded view of the in-wheel motor driving devices in FIG. 1, showing a state before assembly.

As shown in FIG. 2, the speed reducer section B is assemblable into the motor section A from the outboard-side when the outboard-side end member 22c is removed from the outer circumferential member 22a. Specifically, an input shaft 25 of the speed reducer section B is inserted into an output shaft 24b of the motor section A from the outboard-side, to assemble the speed reducer section B and the motor section A with each other.

The outboard-side end member 22c is made of a lightweight metal such as an aluminum alloy, and is formed with bolt holes 63 for the bolts 62 to fasten the fixing ring 33 of the wheel hub bearing section C.

The outboard-side end member 22c and the outer circumferential member 22a are fitted to each other, with an O-ring disposed therebetween which serves as a sealing member 64 for preventing oil leakage from inside.

The wheel hub bearing section C includes a hub ring 32 for an output shaft 28 of the speed reducer section B; and the fixing ring 33 which is connected and fixed to the outboard-side end member 22c of the speed reducer section B using the fastening bolts 62 via a double-row rolling bearing.

The hub ring 32 has a cylindrical hollow section 32a and a flange section 32b. A wheel 14 is fixed and connected to the flange section 32b, with bolts 32c. The output shaft 28 of the speed reducer section B has its outer diameter surface formed with a spline and a male thread. The hollow section 32a of the hub ring 32 has its inner diameter surface formed with a spline hole. With the above-described arrangement, the output shaft 28 of the speed reducer section B is inserted into the inner diameter surface of the hub ring 32, and a nut 32d is threaded to the shaft tip to connect the two members with each other.

The hollow section 32a of the hub ring 32 has its outer surface formed integrally with a wheel mounting flange 32b. The hollow section 32a has an outer diameter surface on the vehicle's outboard-side, where the double-row roller bearing's outboard-side inner track surface is formed integrally therewith. The hollow section 32a has an outer diameter surface on the vehicle's inboard-side, around which there is fitted an inner ring 32e having the bearing's inboard-side inner track surface formed on its outer surface.

The fixing ring 33 has: an inner circumferential surface, which is formed integrally with an outboard-side outer track surface and an inboard-side outer track surface corresponding to the outboard-side inner track surface and the inboard-side inner track surface respectively of the hub ring 32; and an outer circumferential surface formed with an the anchoring flange 33a.

The hub ring 32 and the fixing ring 33 are opposed to each other with their respective outboard-side track surfaces and inboard-side track surfaces, and two rows of balls 34 are placed between these track surfaces.

The wheel hub bearing section C which is shown in FIG. 1 and FIG. 2 is a so-called third-generation wheel hub unit, characterized by, as has been described thus far: that the hub ring 32 has an outer circumferential surface formed integrally with a wheel mounting flange 32b and one of the two inner track surfaces of a double-row rolling bearing; that the fixing ring 33 has an inner circumferential surface formed integrally with outer track surfaces of the double-row rolling bearing; and that the fixing ring 33 has an outer circumferential surface formed integrally with an anchoring flange 33a.

Figure 3:
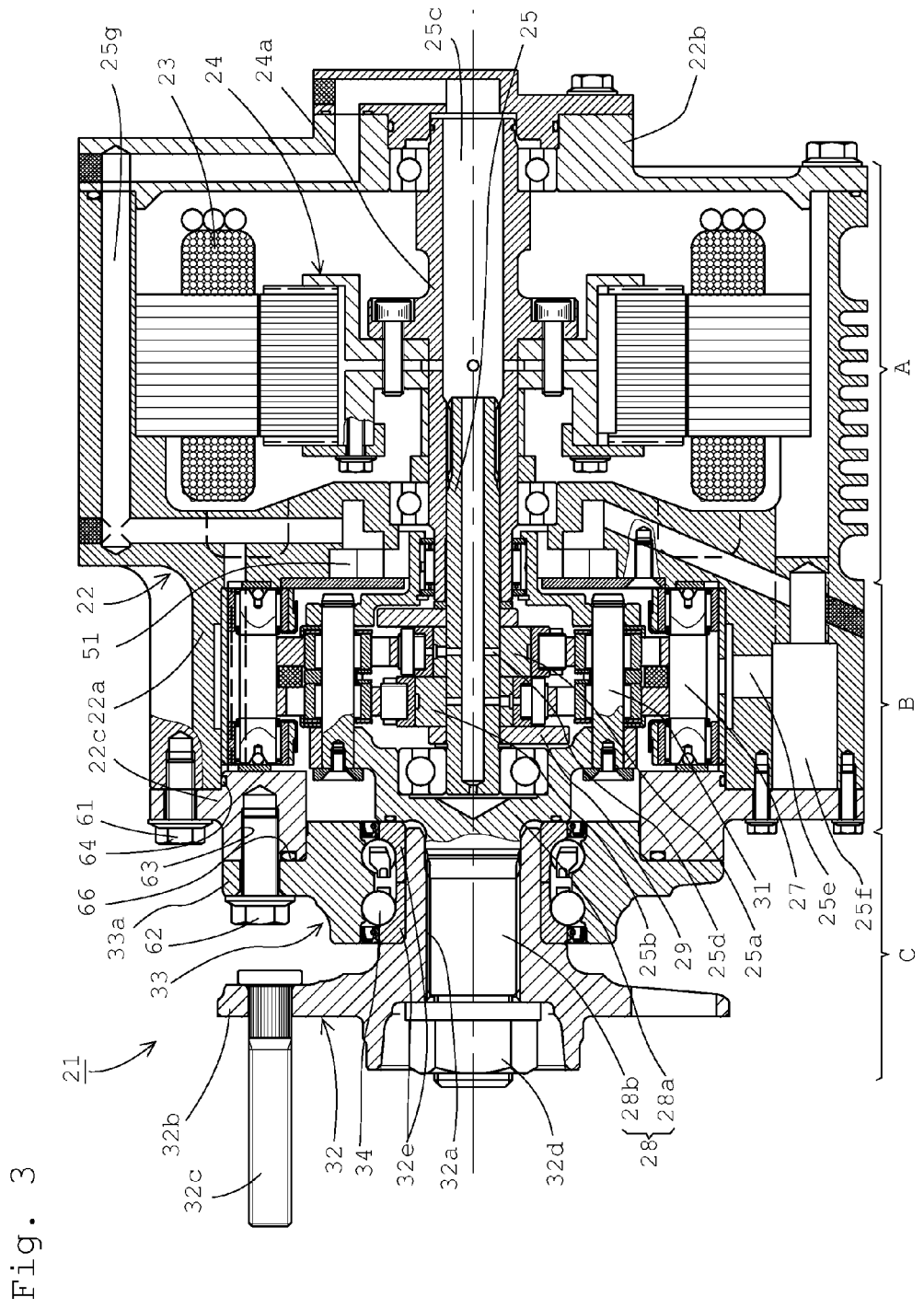
FIG. 3 is a schematic sectional view of an in-wheel motor driving device according to another embodiment of the present invention.

Next, FIG. 3 shows another embodiment, which includes a wheel hub bearing section C of a so-called second-generation wheel hub characterized by that the hub ring 32 has an outer circumferential surface provided with two individual inner rings 32e serving as inner track rings of a double-row rolling bearing. Other arrangements are identical with the embodiment in FIG. 1 and FIG. 2.

Figure 4:
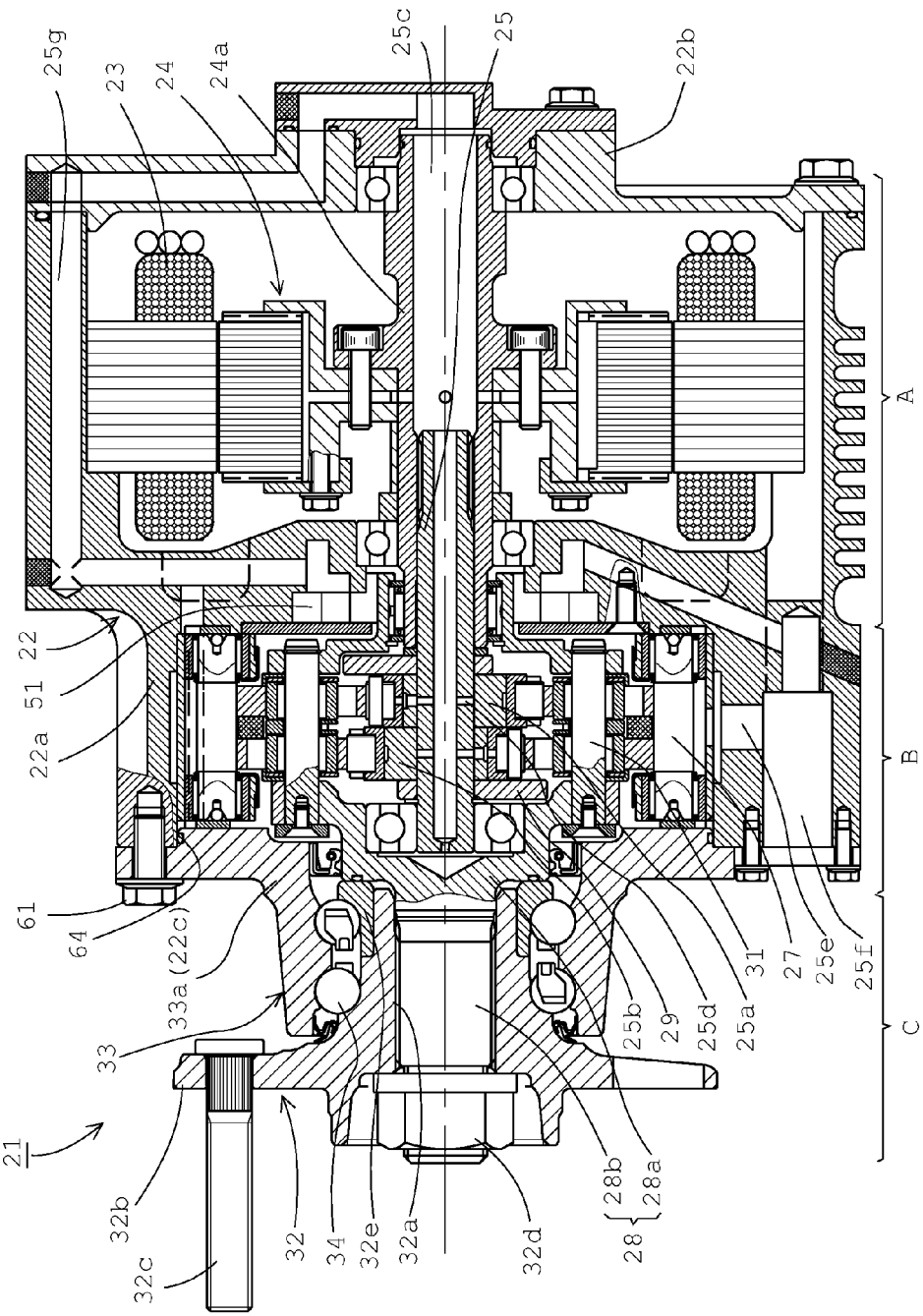
FIG. 4 is a schematic sectional view of an in-wheel motor driving device according to another embodiment of the present invention.
Figure 5:
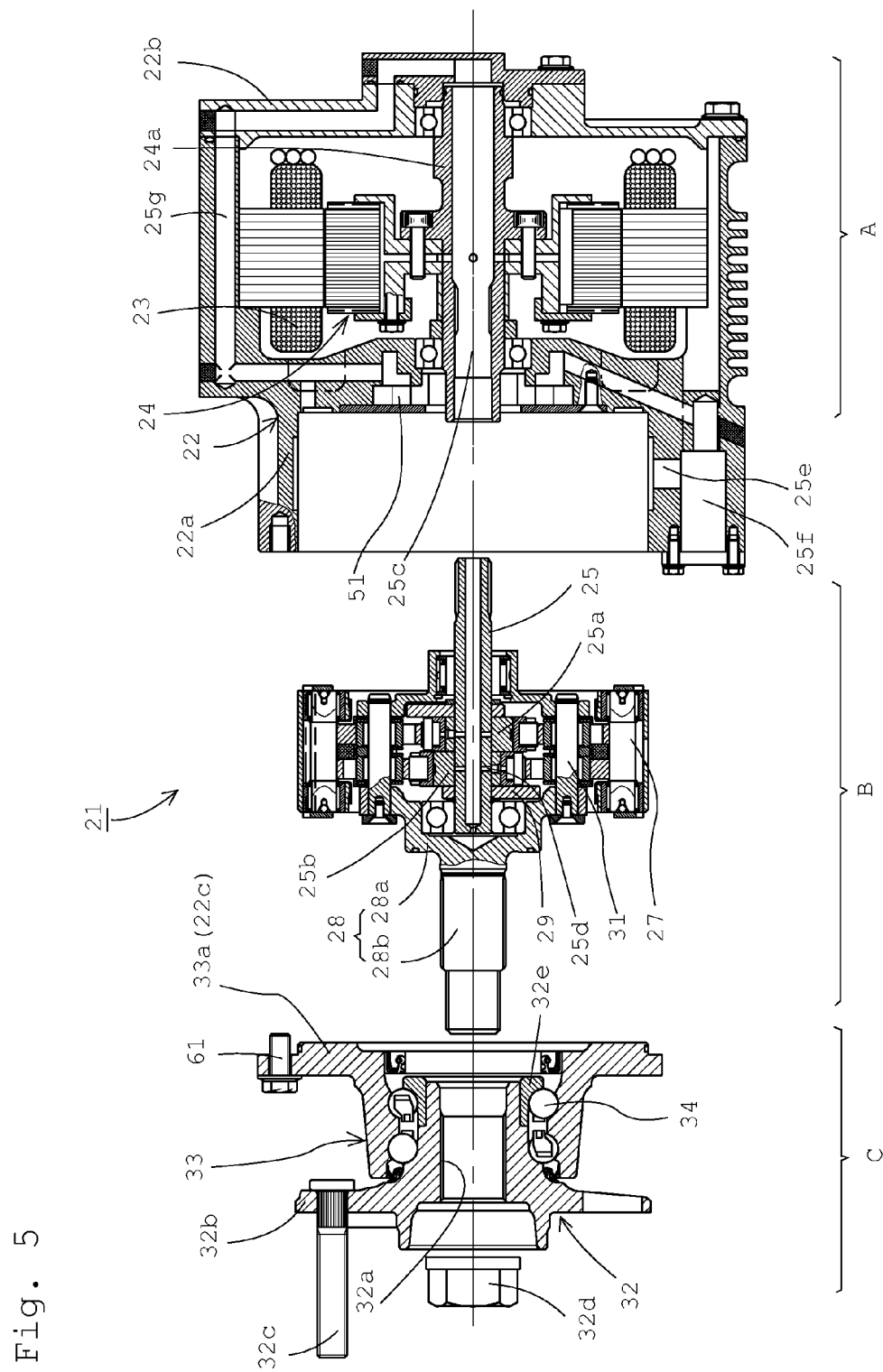
FIG. 5 is an exploded view of the in-wheel motor driving devices in FIG. 4, showing a state before assembly.

Next, FIG. 4 and FIG. 5 show still another embodiment which, like the one shown in FIG. 1 and FIG. 2, includes a wheel hub bearing section C classified as the third-generation wheel hub unit. This arrangement provides an example of using an anchoring flange 33a of a fixing ring 33 as an outboard-side end member 22c. In other words, this embodiment is an example in which the anchoring flange 33a of the fixing ring 33 and the outboard-side end member 22c are integrated with each other. Such an arrangement enables to eliminate the outboard-side end member 22c and the fastening bolts 61, leading to decreased number of parts while contributing to decrease in weight.

Figure 6:
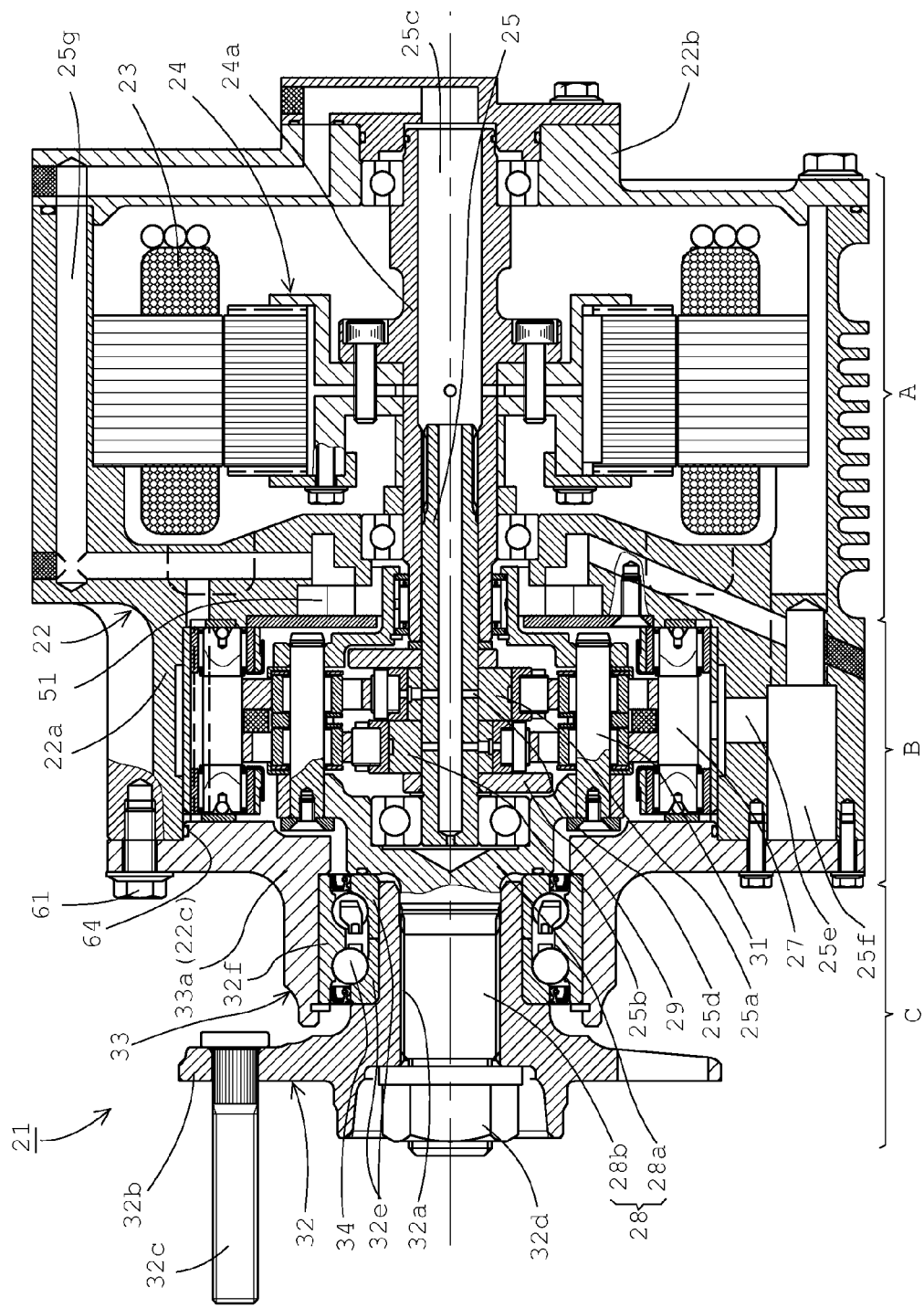
FIG. 6 is a schematic sectional view of an in-wheel motor driving device according to another embodiment of the present invention.

Next, FIG. 6 shows still another embodiment which, like the one shown in FIG. 4 and FIG. 5, uses an anchoring flange 33a of a fixing ring 33 as an outboard-side end member 22c. Note, however, that the wheel hub bearing section C in this embodiment is provided by a wheel hub unit which is of the so-called first-generation.

Specifically, in the wheel hub bearing section C of this embodiment shown in FIG. 6, inner rings 32e which serve as inner track surfaces of a double-row rolling bearing, and an outer ring 32f which serves as outer track surfaces are provided by separate parts from a hub ring 32 and a fixing ring 33. Such an arrangement as described above, where the fixing ring 33 and the outer ring 32f are provided by separate parts, offers an advantage of using a lightweight metal such as an aluminum alloy as a material for an anchoring flange 33a of the fixing ring 33 which is used as an outboard-side end member 22c, leading to reduced weight of the fixing ring 33.

The motor section A is provided by a radial-gap motor which includes a stator 23; a rotor 24 disposed inside the stator 23 and opposed thereto with a radial gap in between; and a hollow output shaft 24a fixedly connected inside the rotor 24 for integral rotation with the rotor 24.

The hollow output shaft 24a is disposed through the motor section A to the speed reducer section B for transmission of driving force from the motor section A to the input shaft 25 of the speed reducer section B.

The input shaft 25 of the speed reducer section B has eccentric sections 25a, 25b within the speed reducer section B. The input shaft 25 is fitted into and fastened with the hollow output shaft 24a of the rotor 24 for integral rotation with the rotor 24. The two eccentric sections 25a, 25b are disposed at a 180-degree phase difference so that their centrifugal forces due to their eccentric movement are cancelled each other.

The speed reducer section B includes cycloid discs 26a, 26b which serve as revolving members and are rotatably held by the eccentric sections 25a, 25b; a plurality of outer pins 27 which serve as outer circumferential engager for engagement with outer circumferential portions of the cycloid discs 26a, 26b; a motion conversion mechanism which transmits rotational movement of the cycloid discs 26a, 26b to the output shaft 28; and counterweights 29 disposed adjacently to the eccentric sections 25a, 25b. The speed reducer section B includes a speed reducer section lubrication mechanism which supplies lubrication oil to the speed reducer section B.

The output shaft 28 includes a flange section 28a and a shaft section 28b. The flange section 28a has its end surface formed with holes at an equidistant interval on a circle centered around a rotational center of the output shaft 28, for fixing the inner pins 31. The shaft section 28b is fitted into and fixed to the hub ring 32, and transmits the output from the speed reducer section B to the wheel 14.

Figure 9:
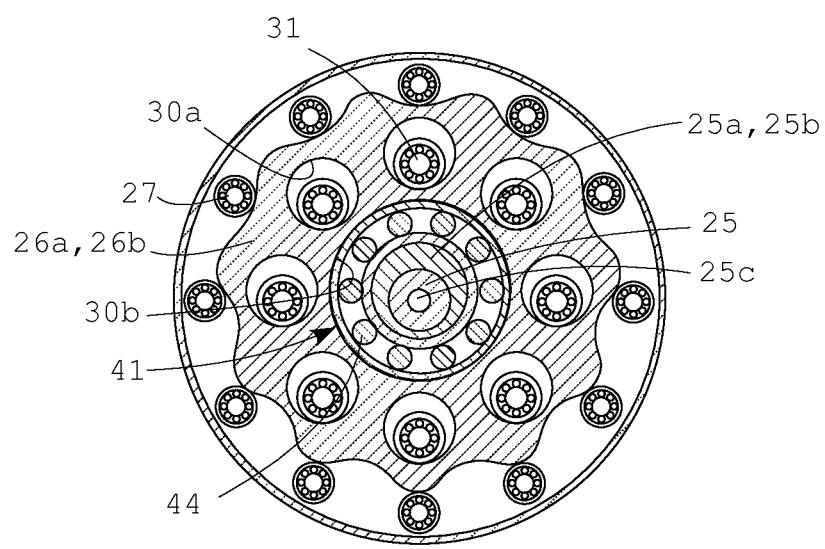
FIG. 9 is a vertical sectional view of a speed reducer section of an in-wheel motor driving device according to the present invention.
Figure 10:
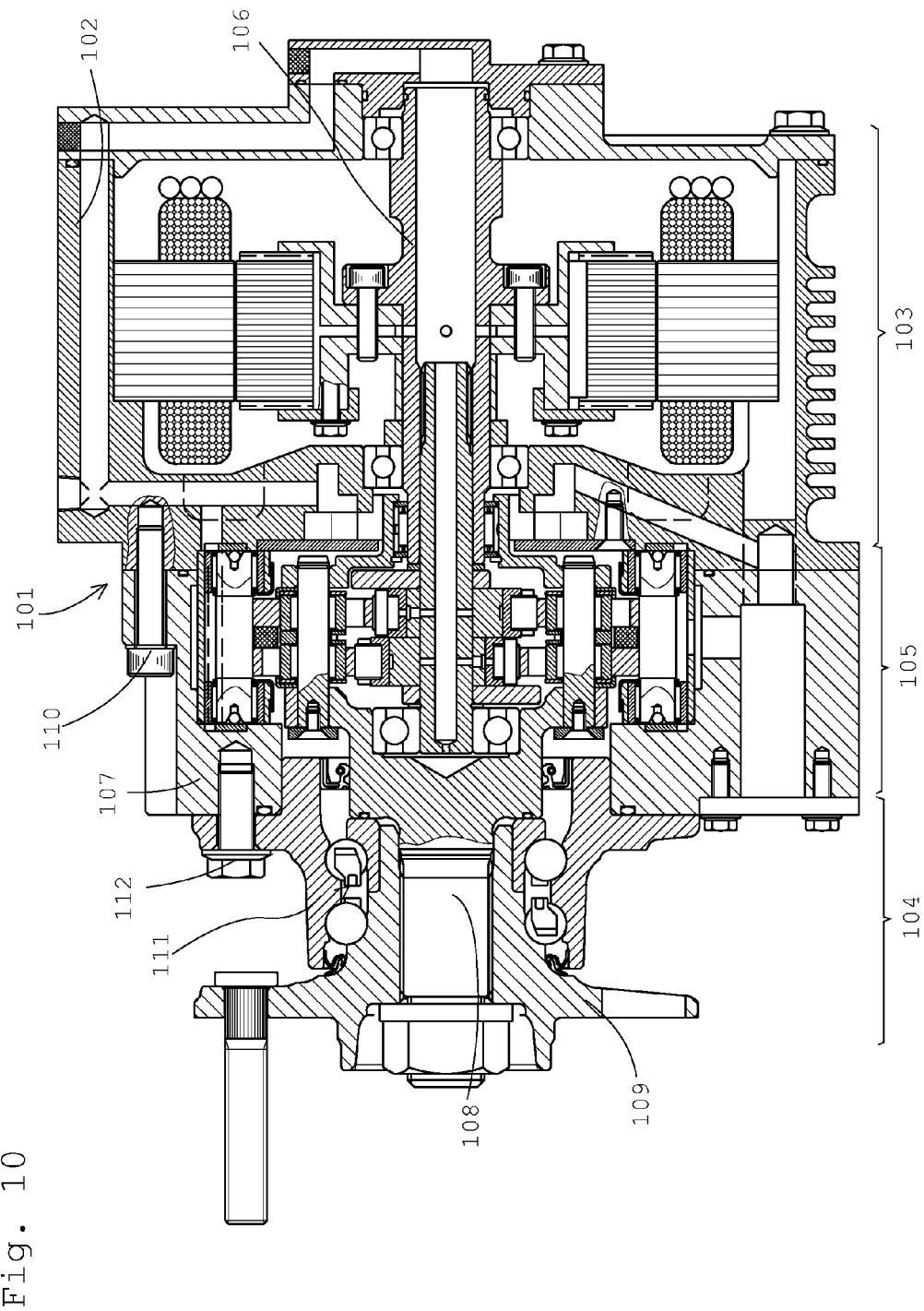
FIG. 10 is a schematic sectional view of a conventional in-wheel motor driving device.
Figure 11:
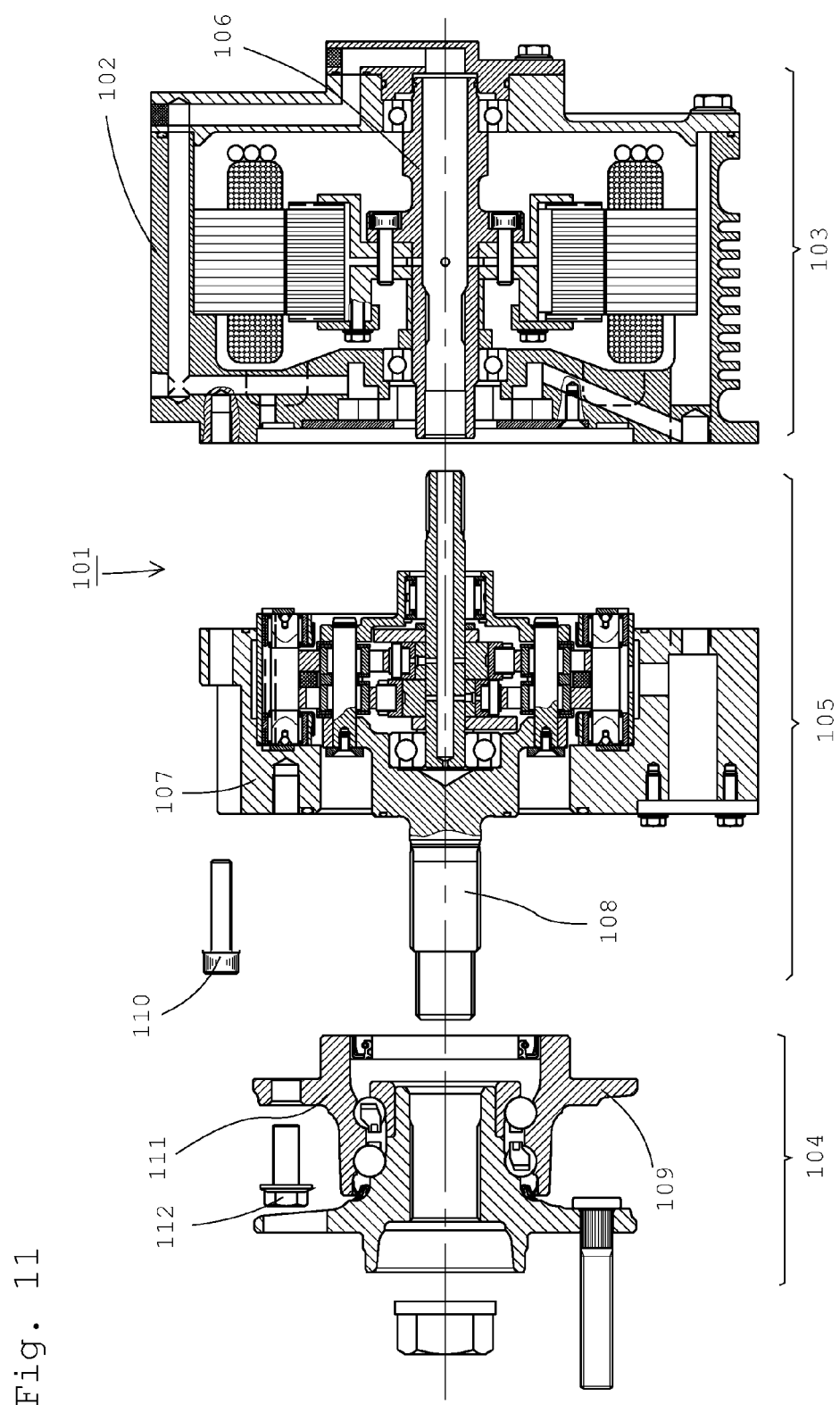
FIG. 11 is an exploded view of the in-wheel motor driving devices in FIG. 10, showing a state before assembly.

As shown in FIG. 9, the cycloid discs 26a, 26b have a plurality of waveforms composed of trochoid curves such as epitrochoid curve, on their outer circumferences, and a plurality of through-holes 30a penetrating from one end surface to the other end surface. The through-holes 30a are made equidistantly on a circle centering on the rotational center of the cycloid discs 26a, 26b, and accommodate inner pins 31 which will be described later. Also, a through-hole 30b penetrates the center of the cycloid discs 26a, 26b, and fits around the eccentric sections 25a, 25b.

The cycloid discs 26a, 26b are supported by a rolling bearing 41 rotatably with respect to the eccentric sections 25a, 25b. The rolling bearing 41 is provided by a cylindrical roller bearing which includes an inner ring member fitted around outer diameter surfaces of the eccentric sections 25a, 25b and having an inner track surface on its outer diameter surface; an outer track surface formed directly on inner diameter surfaces of the through-holes 30b of the cycloid discs 26a, 26b; a plurality of cylindrical rollers 44 disposed between the inner track surface and the outer track surface; and a retainer (not illustrated) which keeps the distance between the cylindrical rollers 44.

The outer pins 27 are disposed equidistantly on a circular track which centers around the rotational center of the motor-side rotation member 25. As the cycloid discs 26a, 26b make their revolutions, the wavy curves and the outer pins 27 engage with each other and generate rotational movement of the cycloid discs 26a, 26b.

The counterweights 29 are disc-like, have a through-hole at a place away from its center for fitting around the motor-side rotation member 25, and are disposed adjacently to the eccentric sections 25a, 25b respectively, at a 180-degree phase difference therefrom in order to cancel unbalanced inertia couple caused by the rotation of the cycloid discs 26a, 26b.

The motion conversion mechanism is constituted by a plurality of inner pins 31 held by the output shaft 28 and the through-holes 30a formed in the cycloid discs 26a, 26b. The inner pins 31 is disposed equidistantly on a circular track centering around the rotational center of the wheel-side rotation member 28, and has one of its axial ends fixed to the wheel-side rotation member 28. Also, in order to reduce frictional resistance with the cycloid discs 26a, 26b, needle roller bearings are provided to make contact with inner wall surfaces of the through-holes 30a of the cycloid discs 26a, 26b.

The through-holes 30a are formed at locations corresponding to the respective inner pins 31. Each of the through-holes 30a has an inner diameter which is larger, by a predetermined difference, than an outer diameter (a "maximum outer diameter including the needle bearing", hereinafter the same will apply) of the inner pins 31.

The speed reducer section lubrication mechanism supplies lubrication oil to the speed reducer section B, and includes a lubrication oil path 25c, lubrication oil inlets 25d, a lubrication oil exit 25e, a lubrication oil reservoir 25f, a rotary pump 51 and a circulation oil path 25g.

The lubrication oil path 25c extends axially inside the input shaft 25 of the speed reducer section B. The lubrication oil inlets 25d extend from the lubrication oil path 25c toward an outer diameter surface of the input shaft 25. In the present embodiment, the lubrication oil supply inlet 25d is provided in each of the eccentric sections 25a, 25b.

Also, the lubrication oil exit 25e and the lubrication oil path 25c are connected with each other by the circulation oil path 25g formed inside the outer circumferential member 22a which constitutes a housing for the motor section A. The lubrication oil discharged from the lubrication oil exit 25e flows through the circulation oil path 25g and returns to the lubrication oil path 25c.

In the embodiments described above, a seal member 66 is disposed on an inner-diameter side along the circumferentially arranged fastening bolts for improved sealing between the anchoring flange 33a of the fixing ring 33 and the outboard-side end member 22c to prevent oil leakage from inside.

The seal member 66 can be provided by an O-ring.

Hereinafter, a working principle of the in-wheel motor driving device 21 will be described.

In the motor section A, coils in the stator 23 is supplied with AC current for example to generate an electromagnetic force, which in turn rotates the rotor 24 which is provided by a permanent magnet or a magnetic member. As the rotor 24 rotates, the input shaft 25 of the speed reducer section B connected to the output shaft 24a of the rotor 24 rotates, which then causes the cycloid discs 26a, 26b to make their revolution around the rotation center of the input shaft 25. In this process, the outer pins 27 come into engagement with the curvy wave patterns of the cycloid discs 26a, 26b to cause the cycloid discs 26a, 26b to rotate in the opposite direction to the rotating direction of the input shaft 25.

As the cycloid discs 26a, 26b make their rotational movement, the inner pins 31 which are inserted into the through-holes 30a make contact with inner wall surfaces of the through-holes 30a. In this movement, the revolving movements of the cycloid discs 26a, 26b are not transmitted to the inner pins 31 and only the rotational movements of the cycloid discs 26a, 26b are transmitted to the wheel hub bearing section C via the output shaft 28 of the speed reducer section B.

In this process, the speed reducer section B reduces the speed of rotation of the input shaft 25 when the movement is transmitted to the output shaft 28. Therefore, the arrangement allows the use of a low-torque high-rotation motor section A since the arrangement can transmits necessary torque to the driving wheel 14 even from such a type of motor section.

It should be noted here that the speed reducer section B of the configuration described above has a speed reduction ratio which can be calculated as (ZA−ZB)/ZB, where ZA represents the number of the outer pins 27 whereas ZB represents the number of wave patterns in the cycloid discs 26a, 26b. FIG. 9 shows an embodiment with ZA=12 and ZB=11, which gives a very large speed reduction ratio of 1/11.

As understood, an in-wheel motor driving device 21 which is compact and has a high speed-reduction ratio can be achieved by utilizing a speed reducer section B which can provide a large speed reduction ratio without requiring a multi-stage configuration. Also, use of needle bearings in the outer pins 27 and the inner pins 31 reduces frictional resistance of these members with the cycloid discs 26a, 26b. This improves transmission efficiency in the speed reducer section B.

By utilizing the in-wheel motor driving devices 21 according to the above embodiments in the electric vehicle 11, it becomes possible to reduce an unsprung weight. As a result, it becomes possible to obtain an electric vehicle 11 which provides superior driving stability.

In the embodiments described above, the lubrication oil supply inlet 25d is formed at the eccentric sections 25a, 25b. The invention is not limited to this, however, and oil supply inlet may be formed at any place in the input shaft 25. It should be noted, however, that in view of stable supply of the lubrication oil, it is desirable that the lubrication oil supply inlets 25d are located at the eccentric sections 25a, 25b.

Also, in the embodiment described above, the speed reducer section B has two cycloid discs 26a, 26b which have a 180-degree phase difference from each other. However, the number of the cycloid discs may be any. For example, three cycloid discs may be used at a 120-degree phase difference.

Further in the embodiment described above, the motion conversion mechanism is constituted by the inner pins 31 fixed to the output shaft 28 and the through-holes 30a provided at the cycloid discs 26a, 26b. However, the present invention is not limited by this, and a motion conversion mechanism of whatsoever configuration may be employed as far as it can transmit the rotation of the speed reducer section B to the wheel hub 32. For example, the motion conversion mechanism may be constituted by the inner pins fixed to the cycloid discs and holes in the wheel-side rotation member.

It should be noted here that in the embodiment described above, working of components are described with their rotation in focus. Actually, however, a force which includes a torque is transmitted from the motor section A to the driving wheel. Therefore, the driving force provided as a result of speed reduction described above has a high torque.

Also, in the above description of the embodiment, electric power was supplied to the motor section A to drive the motor section A, and the driving force from the motor section A was transmitted to the driving wheel 14. There may be an additional, inverse arrangement for situations where the vehicle is decelerating or running down on a slope, to pick a force from the driving wheel 14 and convert it by the speed reducer section B into a high-speed low-torque rotation and transmit this rotation to the motor section A, so that the motor section A can serve as a power generator. Further, there may be an arrangement to store the power generated in this way in a battery for later use to drive the motor section A for example, or operate other electric components on board.

In the above-described embodiments, the motor section A was provided by a radial gap motor. However, the present invention is not limited to this, and any suitable motor may be employed. For example, an axial gap motor which includes a stator fixed to a housing, and a rotor which is disposed inside the stator with an axial gap may be utilized.

Also, in each of the embodiments described above, the speed reducer section B in the in-wheel motor driving device 21 is implemented by a cycloid reduction gear system. However, the present invention is not limited to this, and any speed reducing mechanism may be employed. Examples include planetary gear speed reducing mechanism and parallel axis gear speed reducing mechanism.

Further, the electric vehicle 11 shown in FIG. 7 has the rear wheels 14 serving as driving wheels. However, the present invention is not limited to this, and the front wheels 13 may serve as driving wheels or the vehicle may be a four-wheel drive vehicle. It should be noted here that in the present description, the term "electric vehicle" means any type of vehicle which is driven by electricity. For example, therefore, hybrid cars and similar vehicles should also be included in this category.

Thus far, embodiments of the present invention have been described with reference to the drawings. However, the present invention is not limited to these illustrated embodiments. Any of these embodiments illustrated thus far may be modified or changed in many ways within the scope or within the equivalence of the present invention.

REFERENCE SIGNS LIST 21 in-wheel motor driving device
A motor section
B speed reducer section
C wheel hub bearing section
22a outer circumferential member
22b inboard-side end member
22c outboard-side end member
23 stator
24 rotor
24a output shaft
24b output shaft
25 input shaft
25a, 25b eccentric section
26a, 26b cycloid disc
27 outer pin
28 output shaft
28a flange section
28b shaft section
29 counterweight
32 hub ring
32a hollow section
32b wheel mounting flange
32d nut
32e inner ring
32f outer ring
33 fixing ring
33a anchoring flange
61 bolt
62 bolt
63 bolt hole
64, 66 seal member

The invention claimed is:

1. An in-wheel motor driving device comprising:
a motor section including an output shaft;
a wheel hub bearing section; and
a speed reducer section connecting the wheel hub bearing section coaxially with the output shaft of the motor section,
wherein a housing outer circumferential portion of the motor section and a housing outer circumferential portion of the speed reducer section are integral with each other, being provided by one, outer circumferential member,
wherein an outboard-side end member, which is a separate body from the outer circumferential member, is fixed to an outboard-side end of the outer circumferential member, and the wheel hub bearing section has its fixing ring connected and fixed to the outboard-side end member using fastening bolts,
wherein an outer circumference of an inboard-side end of the outboard-side end member is provided with a protruding wall portion which is fitted to an inner circumference of the outboard-side end of the outer circumferential member, and
wherein a seal member is disposed between the protruding wall portion and the inner circumference of the outboard-side end of the outer circumferential member in order to prevent oil leakage from inside.

2. The in-wheel motor driving device according to claim 1, wherein the wheel hub bearing section includes: a hub ring for mounting a wheel; the fixing ring for fixing to a vehicle; and a double-row rolling bearing between the hub ring and the fixing ring; the double-row rolling bearing having its inner track surfaces and outer track surfaces formed separately from the hub ring and the fixing ring.

3. The in-wheel motor driving device according to claim 1, wherein the outboard-side end member is made of a lightweight metal.

4. The in-wheel motor driving device according to claim 1, wherein the wheel hub bearing section includes: a hub ring for mounting a wheel; the fixing ring for fixing to a vehicle; and a double-row rolling bearing between the hub ring and the fixing ring; the fixing ring having its inner surface formed integrally with outer track surfaces of the double-row rolling bearing.

5. The in-wheel motor driving device according to claim 1, wherein the wheel hub bearing section includes: a hub ring for mounting a wheel; the fixing ring for fixing to a vehicle; and a double-row rolling bearing between the hub ring and the fixing ring; the fixing ring having its inner surface formed integrally with outer track surfaces of the double-row rolling; the hub ring integrally including a wheel mounting flange and having an outer circumference formed integrally with one of two inner track surfaces of the double-row rolling bearing.

6. The in-wheel motor driving device according to claim 1, wherein the outer circumferential member is made of a lightweight metal.

7. The in-wheel motor driving device according to claim 1, wherein the seal member is provided by an O-ring.

8. An in-wheel driving device according to claim 1, further comprising an vehicle.

* * * * *